April 2, 1963 R. L. ABOS ETAL 3,083,941
DIAPHRAGM VALVE
Filed Oct. 5, 1959

INVENTORS
RALPH L. ABOS,
BENJAMIN H. HADLEY
BY THEIR ATTORNEYS
HARRIS, KIECH, RUSSELL & KERN

United States Patent Office 3,083,941
Patented Apr. 2, 1963

3,083,941
DIAPHRAGM VALVE
Ralph L. Abos, 10144 Grovedale Drive, Whittier, Calif., and Benjamin H. Hadley, 261 E. Phillips, Pomona, Calif.
Filed Oct. 5, 1959, Ser. No. 844,550
4 Claims. (Cl. 251—46)

The present invention relates generally to the valve art and more particularly to a novel high-temperature and high rate of flow diaphragm valve for handling fluids which may contain solid foreign material. Specifically, the present invention concerns valves for handling jet-propulsion fuel such as petroleum distillates and liquid oxygen at temperatures up to 600° F. and over a wide range of operating pressures.

Briefly stated, the invention comprises a single or dual diaphragm valve which has deep grooves in the housing members adjacent the outer periphery of each of the diaphragms so that foreign material cannot lodge between the diaphragm and the supporting housing. A deflector plate with a curved outer lip is fastened to the diaphragm so that the lip extends into the groove contained in the flow chamber whereby fluid passing through the valve will direct any foreign material away from the periphery of the diaphragm. One of the housing members contains an inlet in communication with the flow chamber, and spaced concentric ridges with outlet ports therebetween are provided in the inner face of the housing about the inlet, for supporting the diaphragm when it is in the closed position.

As is well known in the art, valves with metallic diaphragms which operate at high flow rates and high temperatures are very susceptible to diaphragm damage, particularly where the fluid being handled contains solid foreign material. The foreign material has a tendency to lodge at the outer periphery of the diaphragm where it is fastened to the housing and the constant flexing of the diaphragm in contact with the foreign material causes the metallic diaphragm to become punctured and to fail.

It is an object of the present invention, therefore, to provide a novel diaphragm valve which contains a metallic diaphragm and which can handle fluids containing solid foreign material at high rates of flow and high temperatures without damaging the diaphragm. More particularly, it is an object to provide such a device which includes means for preventing foreign material from lodging adjacent the outer periphery of the diaphragm.

Another object is to provide a valve with a thin metallic diaphragm which can be used at relatively high pressures. More particularly, it is an object to provide such a valve in which the diaphragm is positively and adequately supported throughout its outer extremities when it is in the closed position.

An additional object is to provide a novel diaphragm valve which closes in stepwise fashion or by closely spaced increments.

Further objects and advantages of the present invention will be apparent from the following detailed description, reference being had to the accompanying drawing wherein preferred embodiments of the present invention are shown.

Figure 1:
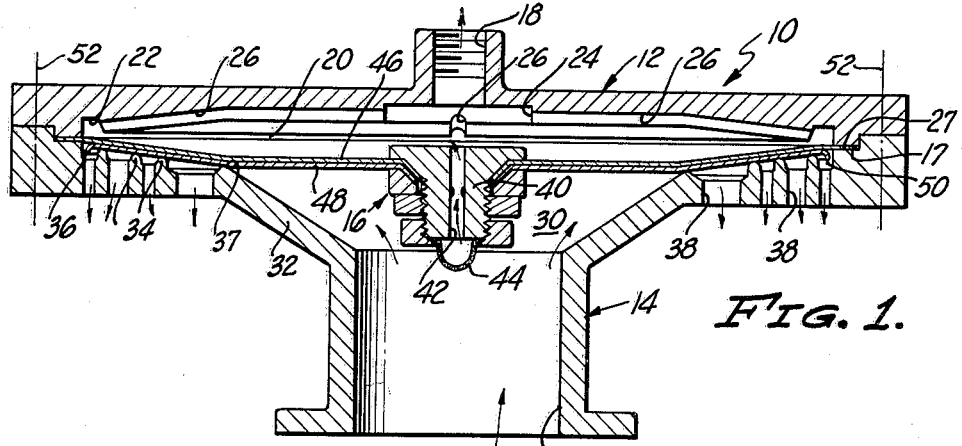
FIG. 1 is a vertical sectional view of a valve containing a single diaphragm, constructed in accordance with the teachings of the present invention.

Referring to the drawing more particularly by reference numerals, 10 indicates a single diaphragm valve embodying the teachings of the present invention, which includes an upper housing member 12 and a lower housing member 14 with a diaphragm assembly 16 positioned therebetween.

Figure 3:
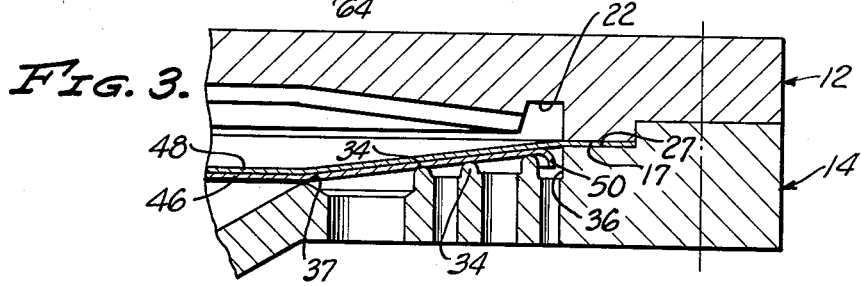
FIG. 3 is an enlarged fragmentary view of the right-hand portion of FIG. 1, showing the periphery of the diaphragm and the supporting housing.
Figure 4:
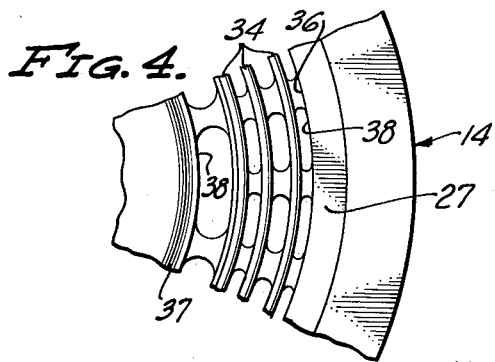
FIG. 4 is a fragmentary plan view of a portion of the lower housing member showing the diaphragm supporting ridges and the outlet passageways formed therebetween.

The upper housing member 12 is of circular shape with a peripheral face 17 and contains a centrally located control port 18 which communicates with a control chamber 20. The outer periphery of the control chamber 20 is provided with an annular groove 22. The control chamber 20 also contains a cylindrical recess 24 adjacent the control port which communicates with the annular groove 22 through four radially extending grooves or troughs 26. The lower housing member 14 is also of circular shape with a peripheral face 27 and an inlet 28 which communicates with a flow chamber 30, the latter being bounded on one side by an end wall 32. Provided in the end wall 32 are a plurality of radially spaced concentric annular ridges 34 which have rounded upper surfaces, the outermost ridge forming an annular groove 36 (FIG. 3) with the outer wall of the chamber. The innermost ridge 37 forms a valve seat for the diaphragm, as will be described more fully hereinafter. As shown in FIG. 4, a plurality of elongated arcuate passageways or outlet ports 38 are provided in the end wall 32 between the ridges 34 and in the groove 36.

Turning to a consideration of the diaphragm assembly 16, it includes a hub member 40 which contains an axially extending passageway 42 having a screen 44 covering the lower end thereof. Fastened to the hub member 40 is a thin metallic diaphragm 46 which has the outer periphery thereof secured between the faces 17 and 27 of the upper and lower housing members, respectively. Fastened to the hub member 40 below the diaphragm 46 and in contact therewith is a metallic deflector plate 48 which has a peripheral lip or flange 50 (FIG. 3) which curves downwardly into the annular groove 36. It will be noted that when the valve is in the closed position with the diaphragm on the valve seat 37 (FIGS. 1 and 3), the diaphragm and the deflector plate are supported on the ridges 34. It will be readily apparent that the upper and lower housing members 12 and 14 can be fastened together at the outer edges thereof by any conventional means and the numeral 52 indicates the position of well known bolt and nut assemblies (not shown).

In operation, when the control port 18 is open, fluid is exhausted from the control chamber 20 through said port faster than it can enter the chamber through the passageway 42 and therefore the fluid pressure in the flow chamber 30 causes the diaphragm 46 to move upwardly off the valve seat 37 and uncover the outlet ports 38. Fluid is then free to pass from the inlet 28, into the flow chamber 30 and out through the outlet ports 38. If the fluid passing through the valve contains solid foreign material, the latter is prevented from lodging in the groove 36 by the flushing action of the fluid as it flows downwardly off the lip 50 of the deflector plate 48. Furthermore, even if foreign matter were to lodge adjacent the periphery of the diaphragm 46, the deep groove 36 would prevent it from coming in contact with the diaphragm as the latter moves between the open position and the closed position. This same result is also achieved in the control chamber 20 by reason of the deep groove 22, but because the flow of fluid through the control chamber is not as fast or as strong as in the flow chamber, nor in a direction to sweep over the diaphragm, there is no advantage in using a deflector plate in the control chamber. It will also be noted that the rounded tops of the ridges 34 and the smooth surfaces adjacent thereto prevent foreign material from lodging in the flow chamber adjacent the outlet ports.

When the control port 18 is closed, fluid passes into the control chamber through the passageway 42 and builds up pressure against the upper surface of the diaphragm. Because the fluid is being exhausted from the flow chamber through the outlet port 38, the diaphragm 46 moves downwardly and when it contacts the outermost ridge 34, the difference in the pressure areas above and below the diaphragm causes it to continue to seat on the ridges in progressive fashion and thereby close the valve in increments or steps, the diaphragm finally contacting and seating on the valve seat 37. As shown in FIGS. 1 and 3, when the diaphragm 46 is in the closed position, it and the deflector plate 48 are amply supported throughout the outer extremities thereof by the series of closely spaced ridges 34, whereby the diaphragm can be subjected to high-pressure differentials when in the closed position with little danger of rupturing it. It will be noted that the ridges 34 and outlet ports 38 could extend radially outwardly and thereby achieve the same supporting and cleansing action, but the valve would not have the additional advantage of increment closing as in the preferred construction. If desired, the hub member 40 with the passageway 42 could be omitted and a bleed passageway provided in the housing between the control chamber 20 and the flow chamber 30.

Figure 2:
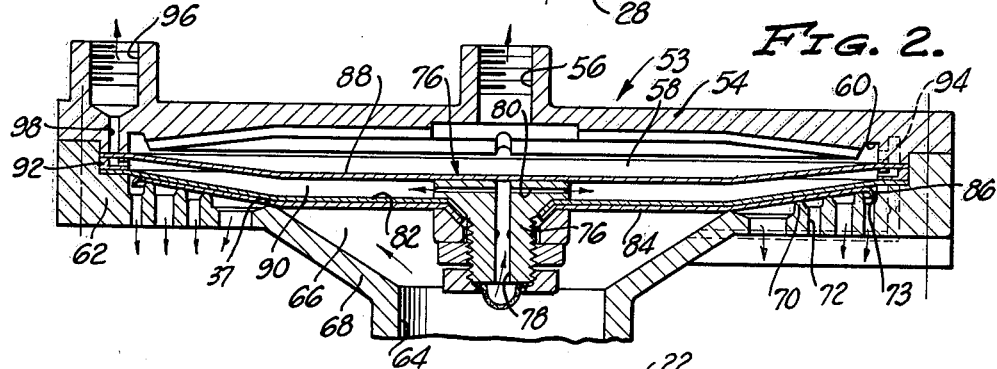
FIG. 2 is a vertical sectional view of a somewhat similar valve containing two diaphragm members.

Turning to a consideration of FIG. 2, it shows a dual diaphragm valve 53 which is very similar in construction to the one previously described except that it has a dual or double diaphragm and an additional control port. Thus, it includes an upper housing member 54 which contains a first control port 56 in communication with a control chamber 58 having a groove 60 at the outer periphery thereof. The lower housing member 62 contains an inlet 64 which leads into a flow chamber 66 which is bounded on one side by a wall 68 containing a series of spaced concentric annular ridges 70 which have outlet ports 72 formed therebetween, the outermost ridge forming a deep groove 73 with the outer wall of the housing. The diaphragm assembly 74 includes a hub member 76 which has an axially extending passageway 78 and an intersecting transversely extending passageway 80. A first metallic diaphragm 82 and a metallic deflector plate 84 with a downturned peripheral lip 86 have the inner edges thereof fastened to the hub member 76. Spaced above the first diaphragm 82 is a second metallic diaphragm 88, the two diaphragms defining an intermediate diaphragm chamber 90. The two diaphragms are fastened at their outer ends between the housings 54 and 62 with an annular spacer member 92 therebetween. As shown at the right-hand side in FIG. 2, a passageway 94 in the spacer member 92 and the upper housing 54 connects the intermediate diaphragm chamber 90 with the control chamber 58. The intermediate diaphragm chamber 90 is also in communication with a second control port 96 through a passageway 98 shown in the left-hand portion of FIG. 2 for use in bleeding off or reducing the pressure on the upstream side of the valve.

It will be noted, therefore, that the dual diaphragm valve 53 is provided with the same novel features previously referred to with respect to the single diaphragm valve in that it contains deep grooves 60 and 73 adjacent the outer edges of the diaphragm members where they are supported in the housings, a deflector plate 84 with a down-turned lip 86 to prevent foreign material from lodging in the outermost groove, and concentric annular ridges 70 with rounded upper surfaces for supporting the lower diaphragm in the closed position and to provide for increment closing.

Thus, it is apparent that there have been provided novel diaphragm valve constructions which fulfill all of the objects and advantages sought therefor. It is to be understood that the foregoing description and the accompanying drawing have been given only by way of illustration and example, and that changes and alterations in the present disclosure which will be readily apparent to one skilled in the art, are contemplated as within the scope of the present invention which is limited only by the claims which follow.

We claim:

1. A diaphragm valve, comprising: concave disc-like first and second housing members, each of which has an end wall which terminates in a peripheral face, said housing members being positioned with the peripheral faces in opposed relationship; a metallic diaphragm extending between said members dividing the housing into a control chamber and a flow chamber and movable between an open position and a closed position, the outer edge of the diaphragm being supported between the opposed faces of the housing members in sealing relationship therewith; an inlet and an outlet in the second housing member in communication with the flow chamber; an annular groove in the end wall of the second housing member adjacent to its peripheral face; and a disc-like deflector member having an outer edge positioned in the flow chamber adjacent the diaphragm, the deflector member having a curved lip at the outer edge thereof extending into said annular groove.

2. A diaphragm valve, comprising: concave disc-like first and second housing members, each of which has an end wall which terminates in a peripheral face, said housing members being positioned with the peripheral faces in opposed relationship; a metallic diaphragm extending between said members dividing the housing into a control chamber and a flow chamber and movable between an open position and a closed position, the outer edge of the diaphragm being supported between the opposed faces of the housing members in sealing relationship therewith; an inlet and an outlet in the second housing member in communication with the flow chamber; an annular groove in the end wall of each of the housing members adjacent the peripheral face thereof providing a space between the portion of the diaphragm adjacent the outer edge thereof and each of the walls; and a disc-like deflector member positioned in the flow chamber adjacent the diaphragm, the deflector member having a curved lip at the outer edge thereof extending into said annular groove in the flow chamber.

3. A diaphragm valve comprising: concave disc-like first and second housing members, each of which has an end wall with an inner surface which terminates in a peripheral face, said housing members being positioned with the peripheral faces in opposed relationship; a metallic diaphragm extending between said members dividing the housing into a control chamber and a flow chamber and movable between an open position and a closed position, the outer edge of the diaphragm being supported between the opposed faces of the housing members in sealing relationship therewith; an inlet in the second housing adjacent the center thereof in communication with the flow chamber; a plurality of spaced ridges formed in the inner surface of the second housing member between the inlet and the peripheral face of said member, for receiving and supporting the diaphragm in the closed position; outlet ports formed in the end wall between said ridges; an annular groove in the end wall of the second housing member adjacent its peripheral face providing a space between the outer edge of the diaphragm and the end wall; and a disc-like deflector member having an outer edge positioned in the flow chamber adjacent the diaphragm, the deflector member having a curved lip at the outer edge thereof extending into said annular groove.

4. A diaphragm valve comprising: concave disc-like first and second housing members, each of which has an end wall with an inner surface which terminates in a peripheral face, said housing members being positioned with the peripheral faces in opposed relationship; a metallic diaphragm extending between said members dividing the housing into a control chamber and a flow chamber and movable between an open position and a closed position, the outer edge of the diaphragm being supported between the opposed faces of the housing members in sealing relationship therewith; an inlet in the second housing adjacent the center thereof in communication with the flow chamber; a plurality of concentric annular ridges formed in the inner surface of the second housing member between the inlet and the peripheral face of said member, for receiving and supporting the diaphragm in the closed position, the outermost ridge providing an annular groove between it and the peripheral face adjacent thereto; outlet ports formed in said annular groove and between the ridges; and a disc-like deflector member having an outer edge positioned in the flow chamber adjacent the diaphragm, the deflector member having a curved lip at the outer edge thereof extending into said annular groove.

References Cited in the file of this patent
UNITED STATES PATENTS

| | | |
|---|---|---|
| 1,269,721 | Kintny | June 18, 1918 |
| 1,524,217 | Small | Jan. 27, 1925 |
| 1,988,026 | Unger | Jan. 15, 1935 |
| 2,416,855 | St. Clair | Mar. 4, 1947 |
| 2,545,944 | Ellms | Mar. 20, 1951 |
| 2,732,856 | Jurs | Jan. 31, 1956 |
| 2,803,265 | Coffey | Aug. 20, 1957 |